(12) United States Patent
Xiao

(10) Patent No.: US 9,870,392 B2
(45) Date of Patent: Jan. 16, 2018

(54) RETRIEVAL METHOD AND SYSTEM

(75) Inventor: Yan Xiao, Changchun (CN)

(73) Assignee: Yan Xiao, Beijing (CN)

( * ) Notice: Subject to any disclaimer, the term of this patent is extended or adjusted under 35 U.S.C. 154(b) by 411 days.

(21) Appl. No.: 13/977,528

(22) PCT Filed: Dec. 31, 2010

(86) PCT No.: PCT/CN2010/080578
§ 371 (c)(1),
(2), (4) Date: Jun. 28, 2013

(87) PCT Pub. No.: WO2012/088706
PCT Pub. Date: Jul. 5, 2012

(65) Prior Publication Data
US 2013/0275466 A1  Oct. 17, 2013

(51) Int. Cl.
G06F 17/30 (2006.01)

(52) U.S. Cl.
CPC .. *G06F 17/30424* (2013.01); *G06F 17/30979* (2013.01)

(58) Field of Classification Search
CPC .............. G06F 17/30864; G06F 17/30289
USPC .................................. 707/791, 828
See application file for complete search history.

(56) References Cited

U.S. PATENT DOCUMENTS

| | | | | |
|---|---|---|---|---|
| 6,772,141 B1 * | 8/2004 | Pratt | ................ | G06F 17/30619 707/7 |
| 7,657,555 B2 * | 2/2010 | Rorex | ............... | G06F 17/30864 707/735 |
| 7,765,247 B2 * | 7/2010 | Tucker | .............. | G06F 17/30377 707/828 |
| 7,831,644 B2 * | 11/2010 | Moritani | ............... | G06F 3/0605 707/828 |
| 2006/0156253 A1 * | 7/2006 | Schreiber | .......... | G06F 17/30557 715/835 |
| 2007/0073734 A1 * | 3/2007 | Doan | ................ | G06F 17/30923 707/707 |
| 2007/0244852 A1 * | 10/2007 | Giulio | ............... | G06F 17/30979 707/707 |
| 2008/0154875 A1 | 6/2008 | Morscher et al. | | |
| 2008/0168135 A1 * | 7/2008 | Redlich | ................. | G06Q 10/10 709/204 |

(Continued)

FOREIGN PATENT DOCUMENTS

CN    101201841 A    6/2008
JP    2010146430 A    7/2010

*Primary Examiner* — Robert Beausoliel, Jr.
*Assistant Examiner* — Alexandria Bromell

(57) ABSTRACT

A retrieval method and system are disclosed. The method involves: A). searching a catalog table of retrieval keywords based on a retrieval keyword inputted by a user at a terminal, and acquiring a first data terms set including the inputted retrieval keyword; B). searching a data table of information index based on each data term of the first data terms set related to the inputted retrieval keyword, and acquiring a second data terms set; C). combining and sending the first data terms set to the terminal wherein the first data terms set is combined in a way of recursion, and sending the second data terms set to the terminal. The solution extracts semantics by formalizing retrieval character strings, and guides and returns retrieval information, thereby improving the deterministic, logic and efficiency of retrieval and user experience.

8 Claims, 11 Drawing Sheets

(56) References Cited

U.S. PATENT DOCUMENTS

2008/0177731 A1 7/2008 Matsuzaki
2010/0169393 A1* 7/2010 Fruchter .............. G06F 3/0605
　　　　　　　　　　　　　　　　　　　707/828

* cited by examiner

| Prototype System | overcoat | Product search |

Brand
merchandise

- overcoat
  - midi coat
  - cotton padded coat
    - high-middle and low coat
    - midi-long coat
  - CP jacket, trousers and overcoat
  - wool coat
    - male/female wool coat
    - female wool coat
  - cashmere coat
    - long cashmere coat
    - short cashmere coat
      - female short cashmere coat
    - male/female cashmere coat
  - kinds of overcoat
  - kinds of T-shirt and coat
  - costume overcoat
  - wool overcoating 4008 Business brand Bernal    ZHUANGDUN OVERCOAT    795 CNY
Company product ranges YAMATO    OVERCOAT    824 CNY
Company product ranges OMNI    OVERCOAT    945 CNY
Company product ranges PEDRAGLIO    PEDRAGLIO OVERCOAT    481 CNY
Company product ranges

Figure 3

- Cloth material
- Lining cloth
  - Imported Lining cloth
  - Imported Top grade Lining cloth
  - Lining cloth For bags
  - Viscose Lining cloth
  - Polyester Lining cloth
    - down jacket Lining cloth
  - shirt Lining cloth
  - Knitting Lining cloth
  - Acetic acid Lining cloth
  - fur Lining cloth
  - Leather Lining cloth

Figure 7

```
                          insurance     Search

⊕ 🗁 Life Insurance
   🗁 Reinsurance                Insurance must implement the government procurement, the funds paid by the fiscal consolidation
 ⊕ 🗁 Additional Insurance
   🗁 Find Insurance             Social insurance inspectors should follow an open, fair, and education and the principle of combining
 ⊕ 🗁 National statutory Insurance  punishment
 ⊕ 🗁 Insurance Insurance
 ⊕ 🗁 Co-operative Insurance
 ⊕ 🗁 Social Insurance           Production and business units are required by law to participate in social work injury insurance, paid
     🗁 Urban social Insurance   insurance premiums
   ⊕ 🗁 Small town social Insurance
     🗁 And social Insurance
     🗁 Injury Social Insurance   Construction, small-scale mining enterprises should participate in work injury social insurance law, having
 ⊕ 🗁 Various kinds of Insurance  paid insurance premiums, shall recruit migrant workers to receive any form of risk mortgage payment or
   🗁 Local Insurance            deposit.
```

Figure 12

RETRIEVAL METHOD AND SYSTEM

TECHNICAL FIELD

The present invention relates to the field of computer information processing, in particular to a method and system for retrieval.

BACKGROUND OF THIS INVENTION

There are many ways of handling retrieval strings in modern information retrieval technique. The most commonly used are those technical proposals based on statistical methods; others are the dedicated information retrieval methods based on specific semantic rules. Between the no processing semantics namely general information retrieval that does not accord to the semantic processing and the specific semantic rules retrieval with complete and specific definition of semantic rules, a mature scheme currently is to use the a aforementioned statistical method to induce and guess the semantics. Besides, now google PageRank method which is known to use great capacity of information on the Internet to link features based on the reference (link directed to).

To sum up, it is clear that the existing information retrieval processing technologies have certain inconvenience and defects in practical use. It is necessary to be improved.

With regards to search tips, the purpose of search engine is to provide users with guide to information. Users get the concerned unknowns through search engines according to the known information. However, the user may not be able to find appropriate and accurate text description of the unknown information. Even if the user knows the main keywords, they hope they can get good and sufficient tips through these keywords. Existing technologies include: 1, the Chinese Patent Application No. 200610112822.4, "Search Tips based on the inversion list". 2. Baidu search engine and Google keyword tool, etc. These techniques generate search tips based on the user input query terms statistics. The disadvantages can be described as follows. First of all, these tips are top-ranking data after filtering. These figures are only a list and are incomplete in terms of the content. Second, these data shown to the users in the form of list contain a huge amount of information because the various pieces of information exist independently and contain a message related to the retrieval words. Therefore, it is difficult for the users to find out the valuable information. Third, the information has no logical structure and semantic features, the given tips make the users disoriented. The Baidu search engine releases only 10 search tips. Google keyword tool can give you up to 150 tips for searching, but these tips are unorganized and illogically correlated. In addition, these search tips is to model based on massive users' behavior. The designer believe that behavior of most people are what the users need. For example, in 2008, Beijing and the Olympics, after vast amounts of user statistics, are believed to have the correlation relationship. In the spring of 2009 with a stream and New Year's Day of 2010, Beijing is thought to have a close relationship with flu and blizzard separately. Once the massive user's clicks change suddenly, the search tips would be directly impacted. In view of this, it is necessary to find better demonstrated methods to retrieve information.

SUMMARY OF THE INVENTION

The purpose of the present invention is to provide an information retrieval processing method and system. The present invention is defined to refine the semantics, guide and return to retrieve information in retrieval string formalization process. It additionally makes search tips more concise and clear, and completely logic.

To achieve the object of the present invention is to provide a retrieval method, comprising the steps as follow, A. Obtain the first set of data items containing the input retrieval words by querying the directory table of the retrieval words according to the user's input on the terminal; there is kinship between the individual items among the first set of data items.

B. Obtain the second set of data items by querying information index data table according to collection of individual item in the first set of data items associated with the input retrieval word;

C. Combine and transmit the collection of the first set of data items to the said terminal; wherein the first set of data items is combined recursively; transmit the said second set of data items to said terminal.

Preferably, the above step A further comprises the following steps:

A1. Generate a said retrieval word directory table.

Preferably, the said step B comprises the following steps in terms of the second set of data items:

A query the index table according to individual data items in the first set of data items by the first data entry, obtain a second set of data items through simple matching; OR A query the index table according to individual data items in the first set of data items by the first data entry, obtain a second set of data items through recursive composition matching.

Preferably, in the said step A1, the directory table of the retrieval words is generated, which comprises the following steps:

A1-1 Determine the containment relations between each other through one-one match of the words in the original retrieval words table;

A1-2 Determine the parent-child relationship according to the determined containment relation between the original strings;

A1-3 Generate sets of data items D1, D2 . . . Dn respectively according to the determined parent-child relationship, wherein, n is greater than or equal to 1; the directory table of retrieval words is composed of the said sets of data items D1, D2 . . . Dn; wherein there is kinship between individual items within Dn.

Preferably, the said containment relations include:

Left-contain, right-contain, center-contain or no-contain.

Preferably, the said step A1-2 includes the following steps:

If at least two original strings constitute left- or right-contain relationship, then the original strings are set to the parent-child relationship, in which the contained original strings are parent;

If at least two sets of original strings constitute contains relationship, then the sets of original strings are set to the parent-child relationship, in which the contained sets of original strings are parent.

Preferably, said step A1-3, when it is right-contain relationship, then the said data items constitute the directory table of the retrieval words, further comprising the combination of data items are sorted based on the string reverse search word table of contents;

Sorting reversely the said strings comprises the steps as follow:

A1-3-1 Generate the new reversed retrieval words field after reversing the retrieval words fields;

A1-3-2 Initialize the inherited lineal tree stack to empty;

A1-3-3 Obtain all [serial number, reversed retrieval words] data by reversing the retrieval words fields;

A1-3-4 Read the current number into the inherited lineal tree stack; if there is no data, namely, the current [serial number, reversed retrieval words]] data is empty, jump to step A1-3-10; Otherwise, go to step A1-3-5;

A1-3-5 Initialize the temporary lineal tree stack to empty;

A1-3-6 If the lineal tree stack is empty, then jump to step A1-3-8;

A1-3-7 If the lineal tree stack is not empty, then look for elder nodes of the current [serial number, reversed retrieval words] data;

If there are elder nodes, then push them on the temporary lineal tree stack. The last one of the elder nodes is a parent node. Modify the value of the current cursor stack to the parent node's number;

If finding no elder nodes in the temporary lineal tree stack, set the stack pointer to 0; assign the value of the temporary lineal tree stack to the inherited one, and push the current data [serial number, reversed retrieval words]] on the inherited lineal tree stack, then jump to step A1-3-9;

A1-3-8 Push the current [serial number, reversed retrieval words]] data on the inherited lineal tree stack, and update the value of the current stack cursor to 0;

A1-3-9 Jump to step A1-34. Read the next [serial number, reversed retrieval words]] data, the loop is executed;

A1-3-10 ends.

Preferably, the step A11 further includes the generation of the original retrieval words data table which comprises the following steps:

Index data according to the information index data table, to generate the set of original strings after removing the repeats in the original retrieval words table Preferably, the retrieval method further includes the generation of the information index data table which comprises the following steps:

Get the index words from the information data table;

Use index words or the set of index words to establish the inverted data sheet, from which generate the information index data table.

Preferably, the retrieval method further comprises the steps:

According to the input retrieval words, query the alias data table and obtain the alias retrieval words associated with the inputted retrieval words;

Use the alias retrieval words as the new retrieval words, repeat steps A-C.

In order to achieve the principle of the present invention, it is to provide an information retrieval processing system which includes:

Information data table module, which is used to store all of the information content;

The information index data table module, which is used to generate and store the information index data table based on all the information content on the above information data table module;

The original retrieval words data table module, which is used to obtain the original string by the removal of the repetitive parts of the index data table, the original string constitute an original set of strings, all of the original string set and stored as the original retrieval words table;

The directory table of the retrieval words module, which is used to match the original strings with others on the original retrieval words data table based on their kinship, and generate a collection of the data items which is stored to be the directory table of the retrieval words;

The search engine module, which is used to query the directory table of the retrieval words according to the retrieval word and obtain the first collection of data items containing the inputted retrieval word; wherein there is kinship between data items in the above first set of data items; Query the information index data table according to the individuals in the first set of data items and obtain a second set of data items associated with inputs; combine and transmit the first and second set of data items to the terminals.

Preferably, the said containment relationship includes no-contain, left-contain, right-contain and center-contain;

The matching within the directory table of the retrieval words module refers to matching one original string with another in terms of containment relationship, generating the set of data items by the original strings which have left-contain and/or right-contain relationship.

Preferably, the said sets of data items constitute a sorted multi-tree.

Preferably, the said search engine module presents the first set of data items related to the input retrieval words in accordance with the recursive relationship of the search tree.

Preferably, the second set of data items is associated with the first set of data items.

Preferably, the processing system also includes a the alias data table module for storing the alias string associated with original string; the alias string is for the alias query;

The second set of data items is associated with the first set of data items through the alias data table.

Compared with the prior art, the present invention at least has the following advantages:

First, the search results provided by the present invention have a strong certainty, depending only on whether or not the retrieval string exists in the directory table of retrieval words, and the information corresponding to the index data table. The result is not dependent on the retrieval behavior of other users, and is not subject to information provider;

Second, provision of the retrieval or search result the present invention is accurate. If the user's search string exists in the directory tables of retrieval words and the index data table, then you can get accurate feedback; if it does not exist, then it would not return the semantic unrelated results.

Third, the technical solution of the present invention has the possibility of logical deduction, obtaining other unknown logically associated with the retrieval strings.

Fourth, the technical solution of the present invention provides the intuitive form of search results, showing the input retrieval string in the form of a recursive directory tree, as well as other strings semantically associated with retrieval string.

Finally, directory table of retrieval words is displayed in the form of recursive directory tree is correspondent to the information index table, making the searching of target information in the information index table fast and precise.

In summary, the present invention does not require huge amounts of data, nor needs statistics. The present invention can be greatly compressed redundant searching tips within, following its high exhaustion degree and recall ratio. Its consistency further helps to improve the precision. Moreover, the present invention has good generality and portability.

BRIEF DESCRIPTION OF THE DRAWINGS

The following is the implementation of the drawings used in the description of cases or the prior art. The drawings are merely some embodiments of the present invention; apparently, for the technicians, they can get other drawings without creative efforts based on these drawings.

As shown in FIG. 3, it is a system prototype screenshots of the present invention;

As shown in FIG. 7, it is the exemplary directory table of retrieval words implementing the present invention;

As shown in FIG. 10-1, it is another display mode of the structure of the recursive directory tree;

As shown in FIG. 10-2, it is showing the search results through the implementation of the present invention;

As shown in FIG. 12, it is a flowchart of obtaining the search result provided by the present invention.

SPECIFIC IMPLEMENTATION MODALITIES

Figure 1:
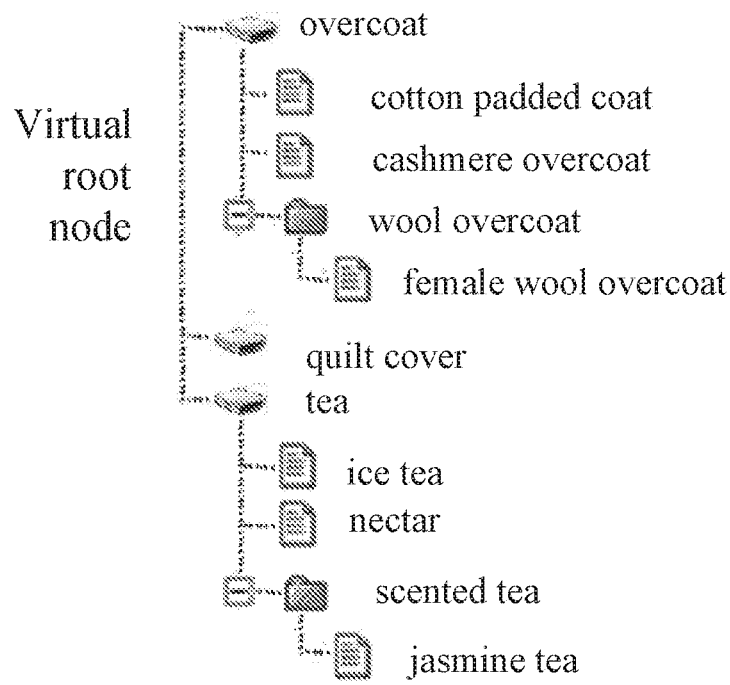
As shown in FIG. 1, it is a structural example of the present invention concerning the directory table of retrieval words.

In conjunction with the drawings, the technical solutions of the present invention will be clearly and fully described below. Obviously, the described embodiments are part of the embodiments of the present invention, rather than all embodiments. Any drawings or works without creative efforts based on these drawings of the present invention are prohibited.

The basic principle of the present invention is to improve the retrieval results objectivity through objectively relationship between existing retrieval strings with target information, to prompt users the said search string and target information. It does not rely on the modeling of the prior art based on the search behavior of the mass users—because this modeling behavior is probably vulnerable to human interference, which could undermine the objectivity of the relationship between the retrieval string and target information, and damage the users' experience. Moreover, the objective link between the retrieval string and the target information is feedback to users in a form of a directory table of retrieval words regarding retrieval string as a node, and the display information is visualize, intuitive and accurate.

After long-term exploration, the inventor found that the target information can be formalized. For example, coat, wool coat, women's wool coat, men wool coat, and imported women's wool coat. Moreover, the correlation between all these objectives is hidden in a similar formalization. For example, there is logical containment relationship between the coat, wool coat, women's wool coat, men wool coat, and imported women's wool. "Coat" is a generic concept of a variety of coat, "wool coat" is a generic concept of a variety of wool coat. Similarly, there is relationship between the computers, desktop computers, notebook computers and LCD notebook computers given their description form. Similar correlation between the target information in terms of form and content is abundant and widespread.

The form and content relevance of target information plays an important role in the improvement of the users' experience. If it can provide users with the correlation between the target information related to the search string after users' input, it will allow users to not only get the common search results, but also other target information associated with the retrieval strings. And the search results are determined by the objectivity in terms of the semantics and classification of the retrieval string, not affected by interference from other users with subjective behavior.

Through effective use of this feature, it will help users quickly locate the target information, get close to the search needs to the largest extent, and thus significantly increase the retrieval efficiency and the capacity and speed of retrieval prompt information.

Based on the principle described above, as shown in FIG. 10, the present invention provides an information retrieval processing system which comprises:

information data table module 1004 is used to store all of the information content;

Information index data table module 1003 is used to generate and store as the information index data table according to the information content stored in the data table module 1004;

Original retrieval words data table module 1005 is used to obtain the original strings after removing the repeated string in the information index data table which constitute an set of original strings. All sets of the original strings constitute the original retrieval words table;

Directory table of retrieval words module 1006 is used to generate sets of data items according to the kinship when match the original strings with each other original string in with the original retrieval words data sheet to, said data item collection formed stored in the directory table of retrieval words;

The alias data table module 1007 which is for the storage of alias string associated with the said original string; the alias string used for the alias query;

Search engine module 1002 is used to search the directory table of retrieval words according to input retrieval words from terminal 1001, obtain the first set of data items containing the input retrieval words; Wherein, there is kinship between the individuals in the first set of data items; search the information index data table for the second set of data items according to the first set of data item associated with the input retrieval words; combine the first set of data items and send it to terminal 1001, as well as the second set of data items.

The information retrieval's processing system of the implementation of this invention works as follows:

(1) Generate an information index data table. The information index data table module 1003 takes all the stored information as the whole data of the information that is to be queried. Then it indexes the full text or summary (Chinese word segmentation needs) and extracts the original string to establish an inverted data table. This data table is the information index data table.

Indexing the full text or abstracts of the information content and extracting the original strings is an existing technology. Therefore, in the implementation of this invention, it won't be described in detail.

The original strings that are extracted after the indexing of the full text or summary are the retrieval string's keywords processed by the system. These retrieval keywords are determined by the objectivity of the information that is to be queried, and the retrieval keywords corresponding to the information that is to be queried may be one to plurality.

(2) Generate the original retrieval words data table. The original retrieval word data table module 1005 chooses the original string in the information index data table exclusively to generate the retrieval word data table. The original retrieval word data table is made up of the only original string, and the only original string included in the original retrieval word data table is the source of the Search Tips data.

(3) Generate a directory table of retrieval words. The directory table of the retrieval words module 1006 matches the any one of the original strings with other original strings included in the original directory table of the retrieval words to determine the inclusion relation between these original strings or the collections of the original strings.

The match only has four results: left-contain, right-contain, center-contain and no-contain. The containment relationship between the original strings reflects the semantic relationship. According to the inclusion relationship, two directly related original strings generate a parent-child relationship to construct the directory table of retrieval words.

(4) Query and obtain the data matching with the input retrieval words according to the retrieval words the user inputs from the terminal 1001 The search engine module 1002 queries the foregoing retrieval word directory table to obtain the first set of data items including the input retrieval words, and the kinship exists between each of the data items of the first set of data items. Query the information index data table to obtain the second set of data items according to each of the data items of the first set of data items corresponding to the input retrieval words. Combine and send the first set of data items, and send the second set of data item to the foregoing terminal 1001.

The search engine module 1002 queries and obtains the Search Tips of recursive directory tree and the data matching with the input retrieval words according to retrieval words the user inputs from the terminal 1001. After receiving the retrieval request, on the one hand, the search engine module 1002 queries the directory table of the retrieval words according to the input retrieval words and returns the retrieval words' structure of directory table that contains the input retrieval words to prompt the information related to the information that is to be queried, and the information that is to be queried is related to the input retrieval words included in the retrieval request. On the other hand, the search engine module 1002 queries the information index data table and obtains information data related to the input retrieval words included in the retrieval request in accordance with the foregoing results. Furthermore, the prompted information presents in the form of the directory table of the retrieval words and clearly shows the recursive hierarchy between the respective retrieval information.

As another implementation way, the original string in the directory table of the retrieval words of module 1006 not only comes from the original retrieval word data table which is obtained by indexing or segmenting, but also can be derived from the data compiled by man.

As an implementation way, the original retrieval word data table module 1005 filter the original retrieval word data table to remove the unnecessary or meaningless original string.

The artificial marshaling is a supplement and re-editing of the indexing or segmenting. When the target information lags behind the new retrieval string, the new retrieval string will be added or edited to the directory table of retrieval words.

Preferably, the generating of the foregoing retrieval word directory table uses a stack-based and non-recursive method, which can deal with mass data in shorter liner time.

Preferably, when the alias data table module 1007 generates the Search Tips of recursive directory tree, it will query the alias data table at the same time, and return the search tips of the retrieval string's alias which the user inputs so as to enhance the user's experience.

Therefore, the present invention is the implementation of information retrieval processing system based on the directory table of the retrieval words. With respect to the prior art, it has the following advantages:

(1) The retrieval strings is displayed by the directory table of retrieval words. Due to the use of the hierarchy, it needs by default to display the first layer of the retrieval words, instead of all the data. If the user needs, all the data can be displayed, making the present invention embodiment exhaustive high and enhancing the recall ratio.

(2) In the present invention, since the containment relationship between the retrieval words is applied in generation process of the directory table of retrieval words, it makes the retrieval strings within a directory table of retrieval words semantically related and unidirectional, namely the interests to users either do not exist or must exist in the directory table of retrieval words. It will greatly improve the users' experience. Because of the semantical undirectionality between retrieval strings within a directory table of retrieval words, the embodiment of the invention has strong undirectionality, helping to improve the precision.

(3) Generation method of directory table of retrieval words uses a linear non-recursive algorithm, which is fast in speed and relatively easy to achieve, the practicality of the present invention.

Figure 11:
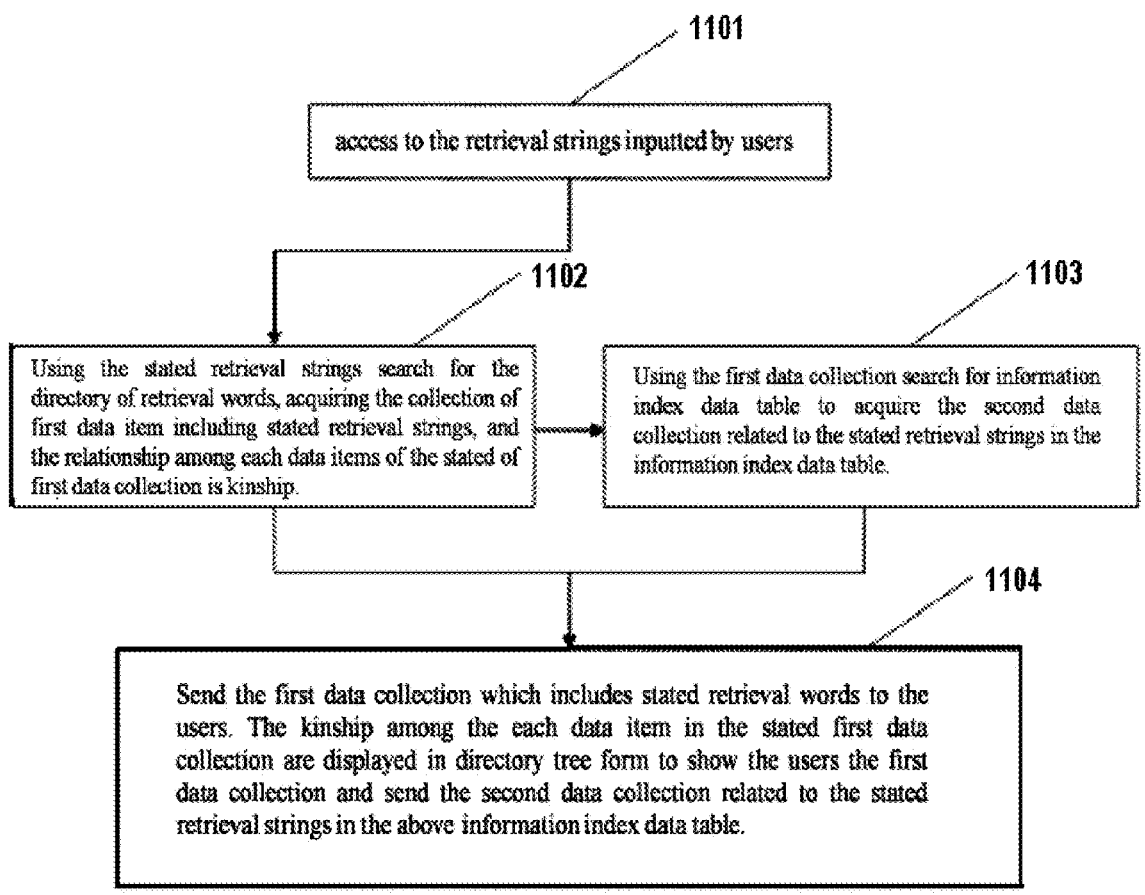
As shown in FIG. 11, it is a flowchart of a retrieval method provided by the present invention.

Shown in FIG. 11, the present invention is a retrieval method which comprises the step as follows:

1101) receive inputted retrieval words from terminal 1001;

1102) query the directory table of retrieval words through the input retrieval words, obtaining the first set of data items and there are kinship relation between the individuals in the first set of data items;

1103) Check the information index data table to obtain the second set of data items according to the first set of data item associated with the input retrieval words;

1104) Send the first and second combined set of data items to the terminal 1001; wherein the first set of data items are combined in a recursive way based on the kinship between the individual data items; the second set of data items matches the input retrieval words.

Preferably, after receiving the said retrieval words, it further includes:

Query the alias data table according to retrieval words from terminal 1001 to obtain the alias retrieval words corresponding to the input retrieval words phrases, and then repeatedly perform step 1102-1104 by using the alias retrieval words as the new retrieval words.

Preferably, after receiving the said retrieval search strings, it further includes:

If the input retrieval words did not exist in the information index data table or the directory table of retrieval words, the user is prompted to re-enter.

Preferably, the said retrieval method further comprises the step of generating said directory table of retrieval words.

Preferably, the access to the second set of data items includes the following steps:

Query the information index table the first data item of each data item, develop a simple match to obtain the second set of data items; or query the information index table the first data item of each data item, develop a recursive match to obtain the second set of data items.

Preferably, the generation of the directory table of retrieval words comprises the following steps:

Match each other within the original retrieval words data sheet to determine the containment relationship between each other;

According to the containment relationship, determine the parent-child relationship between the original strings;

According to the parent-child relationship, generate directory table of the retrieval words which includes the sets of data items D1, D2 . . . Dn, n is greater than or equal to 1. There is kinship between the individual items among the first set of data items.

Preferably, the containment relationship: left-contain, right-contain, center-contain or no-contain.

Preferably, according to the parent-child relationship, generating the directory table of retrieval words may also include:

If the at least two strings constitute left- or right-contain relationship, two string will be set to the parent-child relationship, wherein the string which contains the other is the parent.

Generate the set of original strings namely the original retrieval words data table after removing the repeat in information index data table.

The index data table is generated by the obtained index word by query information; use the name of the index word set or create an inverted data table as an information index data table.

In conjunction with the drawings, the implementation examples and retrieval method of the present invention are described below.

The concepts of the present invention are illustrated as follows:

Directory table of retrieval words: refers to all retrieval string is arranged to a recursive directory tree structure in accordance with the inclusion relation, wherein directly related retrieval strings constitute a parent-child relationship, the superposition of parent-child relationships constitute a recursive directory tree structure. The main source of retrieval string is the original retrieval words data table. It can come from artificial supplement and edited data.

Users: someone or terminal 1001 that can send a message query, including for information query people or query terminal 1001 that use the system.

Retrieval strings: the inputted strings when users query which constitute the directory table of retrieval words.

Search engine: return the content data associated with the input retrieval string.

Information data table module 1004: used to store the data sheet of the specific content which can store through multiple fields. For example, for the commodity information data sheet storing product information, the content can include product type, brand, price, manufacturers and other data.

Information index data table module 1003: used to generate inverted data table through automatic indexing or sub-word of the entire or part contents of the information data table. For example, the said stored commodity information database only generates an inverted data sheet of the commodity type.

Original retrieval words table module 1005: the data after removing the repeated index in the index data table.

The alias data table module 1007 which is for the storage of alias data information. The alias data sheet can be created in a variety of ways, such as synonyms or near-synonyms, for example, potatoes, also known as Murphy. This table is mainly used for search string query expansion, showing both the real name associated with the alias and the alias associated with the real name when users query an alias or real name, thus perfect scope of the search, which can improve and enhance the users' experience.

The following specific steps will describe in detail the various steps of the embodiment of the present invention:

1 Information Index of Data Tables

Inverted list is a common data structure in search engine which is for the index in word, including these words a collection of documents for the item. Then you can quickly find the document collection containing a word or words.

When it is needed to search according to the data items of some recorded non-critical codes, namely find a record based on attribute value, it is necessary to create an index for the attribute values, namely the index table consists of a specifically occurred attribute value and address when the value appears. In this way, we can find the store address of the record or key codes corresponding to the record by inverting attribute value. We call it as inverted index.

Information index data table is exactly inverted list. The word used as an index can be obtained by full-text or summary automatic indexing or sub-word. These indexes word is retrieval strings processed by the system. Information table is the carrier of target information, usually including business information table, legal information table, public resource information table, etc.

The following table indicates the fields of information data table contains sample data, the database field is simplified. Table 1 shows the table structure of information data table. Table 3 shows the table structure of the index data. Table 2 and 4 is specific sample data. The information index data table generation process is illustrated from Table 2 to Table 4. Other forms of index data table can be generated by the technicians according to the index data table generation process in the present invention.

1.1 Information Data Table

Information data table named xinxi, is used to store specific information data.

TABLE 1

| Information data table | |
| --- | --- |
| Field name | Field description of information data table |
| Xinxiid | Serial number of information |
| Title | Titles or names |
| Content | Used to store specific information |
| Relate | Used to store other fields of related information, e.g. time, introduction, etc. |

TABLE 2-1

Sample data of information data table

| Xinxiid | Title | Content | Relate |
| --- | --- | --- | --- |
| 1 | Manufacturer I | Cotton padded coat, wool coat | Established in 1998 |
| 2 | Manufacturer II | Female wool coat, Cashmere coat | Century-old, excellent quality |

TABLE 2-1-continued

Sample data of information data table

| Xinxiid | Title | Content | Relate |
|---|---|---|---|
| 3 | Manufacturer III | Female wool coat, Cashmere coat | State-owned, Enormous potentiality. |

TABLE 2-2

Sample collection data of information data table

| Xinxiid | Title | Content | Relate |
|---|---|---|---|
| 1 | User interface X | Configuration user interface | Configuration user interface . . . |
| 2 | User interface Y | Configuration user interface, upgrade | Configuration and upgrade . . . |
| 3 | User interface Z | Configuration user interface, upgrade, migration, universal serial bus (USB) | USB . . . |

1.2 Information Index Data Table

Information index data tables named xinxiindex are used to store information index data.

TABLE 3

Information index data tables

| Field | Field description of Information index data tables |
|---|---|
| Indexed | Serial number of information index number |
| Xinxiid | Serial number of information labeled by information index |
| Tmsp | Index |

Sample Data

TABLE 4-2

Sample collection data of information index data table

| Indexed | Xinxiid | Tmsp |
|---|---|---|
| 1 | 1 | Cotton padded coat |
| 2 | 2 | Wool coat |
| 3 | 3 | Female wool coat |
| 4 | 4 | Cashmere coat |
| 5 | 5 | Wool coat |
| 6 | 6 | Cashmere coat |
| 1 | 1 | User interface Y |
| 2 | 2 | User interface X |
| 3 | 3 | User interface Z |

In this example, information index data table includes three fields: indexed (serial number of information index numbers), xinxiid (serial number of information labeled by information index) and Tmsp (index). The index field is from full-text automatic indexing or segmentation of content field in information data table. For instance, in table 2, the first data "cotton padded coat, wool coat" becomes two indexes in table 4. Besides labeling its key words, the index—item also records information—item xinxiid marked by index, which is easy to search for data.

In table 4-2, the relationship between collection name and collection of index term is:

User interface X {configuration user interface and upgrade}

User interface Y {Printing, installation, configuration user interface, upgrade, migration, universal serial bus (USB)}

User interface Z {Printing, installation, configuration user interface, upgrade, migration, universal serial bus (USB), using wizard, installation}

The technicians in this field shall know that adding, deleting or changing the fields in data tables can correspondingly obtain the function of editing information index data tables, which obviously don't overstep the core idea of the implementation of this invention.

2 Generating the Original Retrieval Word Data Table

The generation of original retrieval word data table can be achieved by undertaking unique selection with the index field in the information index data table. Original retrieval word data table is the original data for generating the directory table of the retrieval words. If necessary, original retrieval word data table can be updated by replacing the retrieval strings in it. This process can be repeated constantly when needed. For example, when the information index data table has changed, index field will probably respond to this change. Thus, when it generates new retrieval string under the unique selection process, the original retrieval word data table will be updated.

The original retrieval word data table can be used to store the original retrieval strings. One possible way of realization of this process is demonstrated as following. Original retrieval word data table contains two fields: the retrieval words as well as their serial numbers. The table name is tmsporiginal.

Tmsporiginal:

TABLE 5

The original retrieval word data table

| Field | Field description of original retrieval word data table |
|---|---|
| Indexed | Serial number of retrieval string |
| Tmsp | Retrieval string |

Sample Data:

TABLE 6

Sample data of original retrieval word data table

| Indexed | Tmsp |
|---|---|
| 1 | Cotton padded coat |
| 2 | Wool coat |
| 3 | Female wool coat |
| 4 | Cashmere coat |

Take the information index data table shown in Table 4 as example. Four retrieval strings include cotton padded coat, wool coat, female wool coat, cashmere coat. We can get the original retrieval word data table in table 6 after numbering each of those four retrieval strings.

When the original retrieval string need to be added, we can adopt appending method by adding new retrieval string directly at the end of table 6 and give the new ones serial numbers so that the numbering sequence of the original will not be disrupted.

The retrieval strings and its numbers can be deleted when the original retrieval string need to be deleted; when the original retrieval strings need to be replaced, we can either add the original ones or replace the targeted retrieval words and their serial numbers in the original retrieval word data table.

As is widely acknowledged in the professional field, the focusing points to different types of targeted information are different. For example, in commodity data base, customers are apt to pay more attention to the product name, type, price, manufacturer, and production place, while in law data base, the users are likely to focus on the subject, object, conditions and time limitations. However, this has not stretched out of protect limits of the implementation of this invention and all of them can be proceeded with technical solution of the implementation of this invention.

3 Generating Directory Table of Retrieval Words

To generate a directory table of retrieval words is mainly achieved by matching the containment relation. For any retrieving string in original retrieval word data table, matching it with other retrieving strings in original retrieval word data table to identify its inclusion relation with other retrieving strings. After the processing according to different inclusion relations, the directory table of retrieval words is generated thereby.

In the implementations of this invention, acquiescing in the inclusion relation among characters is namely to indicate the inclusion relation in semanteme. For instance, "wool coat" is a generic concept of "women's wool coat". "Wool coat" includes "women's wool coat" in semanteme. According to the syntax analysis, when two characters are in inclusion relation, the included word is often the segmented type of being included word or hypogyny conception. After the included word removes the same part in the word that is included, the relation between the rest and the word that is included is generally modified relation or complementary relation, etc. For example, "fountain pen" and "pen"; "pen" and "pen refill". The inclusion relation between words can be divided into four parts in line with whether the two character strings include or location of included word and the word that is included: left-contain, right-contain, center-contain and no-contain.

To classify the retrieving strings in line with the above four relations between characters, a tree-like directory list of retrieval words can be constructed. This directory table is a sorted multi-tree; between the two adjacent nodes in the same tree, the parent node is the longest included character strings of child node. Root node of the tree is a virtual one, if removing this virtual node, a string forest can thereby be generated.

As shown in FIG. 1, it is one of the structure samples of directory table of retrieval words in this invention. Strings included in this sample are: coat, cotton-padded coat, cashmere coat, wool coat, women's wool coat, quilt cover, tea, water tea, fruit tea, flower tea, jasmine tea. The samples above show the right-containment, such as "cotton-padded coat" rightly includes "coat".

In the processing of inclusion relations, exclusiveness is usually ignored, it just need to identify three other inclusion relations. In addition, the center inclusion can be generated by the compounding of "left inclusion" and "right inclusion", for example, "women's wool coat" medially includes "wool", also can be split into "women's wool coat" rightly includes "wool coat" and "wool coat" left includes "wool". In this invention, matching in the inclusion relations contains two processes. One is left inclusion process; the other is right inclusion process. The two processes are similar, and after the two processes, the inclusion relation of two retrieving strings can be identified. In the following description of the specific implementation process, mainly illustrating the right inclusion matching process, the left inclusion and center inclusion will be illustrated with samples later. This invention can construct a directory list of retrieval words with all retrieving strings according to the inclusion relations between retrieving strings within linear time.

3.1 the Concepts Used in Directory Table of Retrieval Words Parent-Child Relationship and Node In the directory table, strings located at different nodes are in the relationship of parent and child. This parent-child relationship can be defined as follows: character string is consisted of a number of characters, namely, character string=(character n . . . character 3, character 2, character 1).

When string 2 is ended with all characters in string 1, namely, string 2 rightly includes string 1, so the string 1 is the elder node of string 2; for example, "coat" is the elder node of "wool coat" and "women's wool coat", and "wool coat" is the elder node of "women's wool coat".

One node can have a number of elder nodes and length of these nodes may be different, for example, "wool coat" and "coat" are elder nodes of "women's wool coat".

Parent node: if string 1 is the longest (or conformity is the largest) elder node of string 2, taking the string 1 as the parent node of string 2, namely, "wool coat" is the parent node of "women's wool coat", "coat" is the parent node of "wool coat".

When a certain string has a parent node, this string will be consisted of two parts: parent node string and prefix string. Among them, the parent node string is laying behind the whole string, called suffix string, for example, "coat" in the "wool coat"; the other part in front of the whole string is called prefix string, for example, the "wool" in the "wool coat".

Brotherhoods: Brotherhoods are two or more coordinating nodes under the same parent node. For example, the "women's wool coat" and the "men's wool coat" that are under the "wool coat".

Kinship: the relationship is the general term of all the node relations under the same root node, including parent and child relationship, brotherhoods and the relationship between the nodes that consisted of associated parent-child relationship and brotherhoods. Like a family is the offspring of an ancestor, these offspring members have relationships; even though some are parent-child relationships, some are brotherhood relationships; the others are nephew relationships, and so on. In terms of catalog tree of retrieval words that included the word "coat", under which the other nodes have direct or indirect parent and child nodes relations, all the nodes including "coat" in this directory tree has relationship with each other. Other retrieving strings excluding "coat" are direct or indirect strings of "coat". The nodes that have no direct parent-child relationship or brotherhood relationship belong to the same directory tree based on this relationship. This relationship such as parent and child, brotherhoods, direct or collateral line and so on is to point out the basis of a recursive catalog tree for users. The directory tree of retrieval words is like a family pedigree displayed in the form of recursive directory tree.

3.2 Directory Table of Retrieval Words

In the implementations of this invention, directory table of retrieval words can be stored in form of data table. Here, taking the simplest model as an example to illustrate, improvement and optimization can be made on the basis of this core. Data table mode of directory table of retrieval words in this invention mainly contains four fields:

Number field id, is used for storing the numbers of a string;

Retrieval words field tmsp, is used for storing the retrieval word;

reversed retrieval words field untmsp, is used for storing the reversed retrieval words. Parent node field bplus, is used for storing the parent nodes's id field value, if there's no parent node, the field is 0.

The directory table of retrieval words is a sorted multi-tree The study by the inventors found that sorting according to characters after reversal of index name string happens to be depth traversal of directory table of retrieval words. Because the index name string first reverses, then sorts, the strings constituted a parent and child relationship are certainly adjacent for having the same right inclusion strings. Next, table 11 will be referred to illustrate. The concrete data is the sub-tree that the "coat" in. For instance, "cotton-padded coat", "wool coat", "women's wool coat" and "cashmere coat" are child nodes of right inclusion of "coat" or child notes of child notes. After reversing all these strings, "taoc", "taoc deddap-nottoc", "taoc loow", "taoc loow s'nemow" and "taoc eremhsac" have the same left string "taoc", thus they are certainly adjacent when sorted.

For example, "women's wool coat" is the right inclusion child node of "wool coat", after reversing the strings; they become "coat wool" and "coat wool women's", the two strings are certainly adjacent when sorted.

In terms of the "coat", after reversing and sorting, the children nodes of it and children nodes of children nodes become "taoc", "taoc loow", "taoc loow s'nemow", "taoc deddap-nottoc" and "taoc eremhsac". We can see that, the children nodes and children nodes of children nodes will be sorted together, while the children nodes will appear close to parent nodes, then the other children nodes with the same parent nodes, this permutation happens to the depth traversal of the tree.

Therefore, on the basis of the above logic relationship, a directory table can be constituted on the basis of data item combination sorted after reversal of string.

In this invention, we use stack for processing instead of recursive method to make the computing time be linear time and use the existing data structures to realize stack in the computer. In the course of storing, stack can be realized with strings. Such as: 1. coat; 2. wool coat; 3. women's wool coat. This stack is called inherited lineal tree stack.

The unit content before semicolon is the parent node of unit content behind the semicolon. The stack unit content contains two parts, field id and field tmsp, using a "comma" to separate the two parts and using a "semicolon" to separate the stack units. Push and pull operations are achieved by correlation function of the string; the push operation is transferred to attach the content of unit to the stock string and the pull operation is transferred to return to the string before the reciprocal second semicolon.

In this invention, setting temporary lineal tree stack string to do stack processing. In this implementation, the sample data are: 1. coat; 2. cashmere coat; 3. wool coat; 4. women's wool coat; 5. cotton-padded coat; 6. quilt cover. Specific steps are as follows:

Step 1) Generating the field untmsp after reversal of field tmsp, for example, "cotton-padded coat" changed into "taoc deddap-nottoc" after reversal;

Step 2) Initialized inherited lineal tree stack string is empty (here only exists parent and child relation, no brotherhood. The brotherhood means two or more coordinating nodes under the same parent node, such as, wool coat and cashmere coat have brotherhood for coat). The content of the stock is the id and untmsp data of the present inherited elder node.

Step 3) Sorting with untmsp to get all [id, untmsp] data, such as the data returned in sequence: "1. taoc; 2. taoc loow; 3. taoc loow s'nemow; 4. taoc deddap-nottoc; 5. taoc eremhsac; 6. revoc tliuq";

Step 4) Create the sql cursor and Read the current data [id, untmsp] to inherited lineal tree stack, if there is no data, that is, the current data [id, untmsp] is empty, jump to step 10). To sample data, the read-in data at the first time is tmpid=1, tmpuntmsp=" "; the read-in data at the second time is tmpid=3, tmpuntmsp="taoc loow"; and the read-in data at the third time is tmpid=4. Tmpuntmsp="taoc loow s'nemow", and so on. If there is no data, jump to step 10).

Step 5) Initialized temporary inherited lineal tree stack string is empty (only has parent and child relation, no brotherhood);

Step 6) If the inherited lineal tree stack string is empty, jump to step 8);

Step 7) If the inherited lineal tree stack string is not empty, searching the parent node of present data [id, untmsp] from the inherited lineal tree stack string;

Then, put the above parent node to temporary lineal tree stack string. The last one in the elder nodes described is the parent node of this elder node, modifying the present cursor bplus field value to parent node id;

If elder node can't be found in inherited lineal tree stack, set the cursor bplus field value as 0, giving the value of temporary lineal tree stack to inherited lineal tree stack and pushing the present data [id, untmsp] on the inherited lineal tree stack, then jump to step 4;

For example, when the cursor gets up to the second data "3. taoc loow", stackstring="1, taoc"; after the judgment, we can know that "taoc" is the parent node of "taoc loow", now modifying the current Bplus value of the cursor to 1, the temporary lineal tree stack tmpstackstring="1, taoc;" Giving the value of the temporary lineal tree stack to inherited lineal tree stack, and then pushing the present "3, taoc loow" to stack, obtain stackstring="1, taoc; 3, taoc loow";

Step 8), pushing the current data [id, untmsp] on the inherited lineal tree stack, such as the first push operation, stackstring="1, taoc"; Updating the Bplus field of present cursor to 0;

Step 9), Move the cursor to next. jump to step 4), read the next data [id, untmsp], perform cycle operation;

Step 10), end.

The data pattern of sample data after the reverse processing of string is as shown in table 10. Bplus parent node is initialized to 0.

TABLE 10

| Id | Tmsp | Untmsp | Bplus |
|---|---|---|---|
| 1 | coat | taoc | 0 |
| 2 | cashmere coat | taoc eremhsac | 0 |
| 3 | wool coat | taoc loow | 0 |
| 4 | women's wool coat | taoc loow s'nemow | 0 |
| 5 | cotton-padded coat | taoc deddap-nottoc | 0 |
| 6 | quilt cover | revoc tliuq | 0 |
| ... | | | |

Sort the field untmsp in table 10 and output table 11. Assignment of Bplus has been done in table 11 according to this algorithm. This table also adds item id for 28, 29 and complementarily instructs the assignment of Bplus.

TABLE 11

| Id | Tmsp | Untmsp | Bplus |
|---|---|---|---|
| 1 | coat | taoc | 0 |
| 3 | wool coat | taoc loow | 1 |
| 4 | women's wool coat | taoc loow s'nemow | 3 |
| 5 | cotton-padded coat | taoc deddap-nottoc | 1 |
| 6 | Qult cover | revoc tliuq | 0 |

TABLE 11-continued

| Id | Tmsp | Untmsp | Bplus |
|---|---|---|---|
| 28 | cotton-padded quilt cover | revoc tliuq deddap-nottoc | 6 |
| 29 | thick cotton-padded cover | revoc deddap-nottoc kciht | 28 |

In table 11, Bplus value indicates the parent-child relation with data processed in table 9. For example, the Bplus value for coat is 0, indicating that it is a root node and no parent node; the Bplus value for wool coat is 1, indicating that it is a child node of coat (value of ID is 1); the Bplus value for women's wool coat is 3, indicating that it is a child node of wool coat (value of ID is 3). In the same way, cotton-padded cover (value of ID is 28, Bplus is 6) is a child node of quilt cover (value of ID is 6), and the like.

According to the generated parent-child relation (id, bplus), the tree structure constructed is as shown in FIG. 1, in which includes contents of tea, water tea, fruit tea and flower tea and so on, generating process of tree structure for this part is the same as the "coat", so it will not be repeated here.

Figure 2:
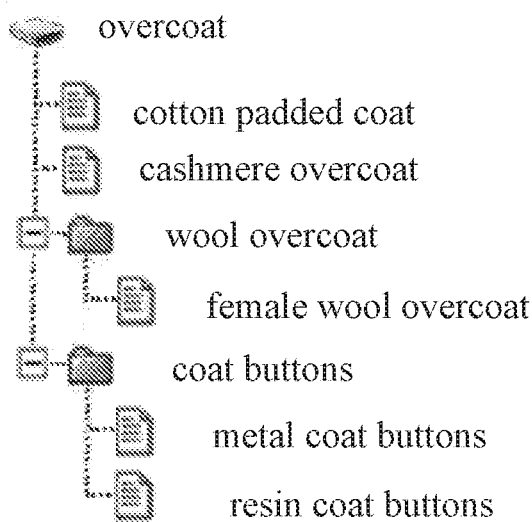
As shown in FIG. 2, it is mixed display of the directory table of retrieval words when left-contain and right-contain exist simultaneously.

As show in FIG. 2 is the result of mixed display of directory table of retrieval words, under the circumstance that left inclusion and right inclusion strings in this implementation exist simultaneously. "cotton-padded coat" and "wool coat" are in a relation of right inclusion with "coat"; "coat button" is in a relation of left inclusion with "coat"; "metal coat button" is in a relation of right inclusion with "coat button"; "metal coat button" is in a relation of center inclusion with "coat". Here the center inclusion can be completed by a right inclusion and a left inclusion.

On the basis of the above process, improvement and optimization can be done as well, which included:

(1) The processing of two child strings under the same parent string. For instance, "heavy transportation" and "heavy lift transportation" don't constitute relations of left inclusion, right inclusion or center inclusion, but they have the same parent string "transportation". If removes the parent string, "large articles lifting" left includes "large articles", in this case, secondary processing can be done, namely, classifying the "large articles lifting transportation" as the child string of "large articles transportation". This processing can reduce the number of child strings under the same parent string.

(2) Increasing all kinds of auxiliary fields to speed up the show of information data in directory list of retrieval words. Such as add field to store the the number of layers where the current node is in, or add field to store the serial number of the current nodes in his root node's child nodes, and so on.

4 Returning Search Tips in the Form of Directory Tree and Data Matched with Retrieving String The search engine will search two tables after receiving the retrieving string that users input. One table is the directory table of retrieval words. Through searching the directory list of retrieval words, the first data item collection that includes the described retrieval words will be gotten and show the described data collection to users in the form of recursive directory tree. The other table is data sheet of information indexes. Through searching this table, the second data item collection that related to the retrieval words will be gotten, namely, the data that related to the first data item collection in data table of information indexes, then returning this data to users.

Technical personals in this field understand that the directory table of retrieval words can include all of the retrieval strings or part of the retrieval strings. For example, clothes, electronic products, law database and other strings can be listed into one directory table of retrieval words, or can also be listed into three directory tables of retrieval words. As the same with clothes, they can be split into several directory tables; anyway, it is beyond the protection scope of this invention. And no matter in any way, what it returns will only be the directory table of retrieval words that includes the retrieval words users input instead of the directory table of retrieval words that excludes the retrieval words users input. From this perspective, the directory table of retrieval words can be interpreted as multiple directory tables consisted of multiple root nodes, each root node forms a directory table of the retrieval words and each retrieval string is affiliated with a directory table of retrieval words under a root node.

As shown in FIG. 3, it is a system prototype screenshot of this invention. The retrieval string that user input is "coat", after finishing the input of retrieval string, this sample takes the "coat" as example to return information to users; the mainly content includes two parts: the first part is the content obtained from the directory table of the retrieval words, and the second part is the content returned from the data table of information indexes.

The first part is the relevant retrieval string collections of this retrieval string after using the described retrieval string to search the directory table of retrieval words. As shown in the left of FIG. 3, it shows the directory table of retrieval words that relevant retrieval string in, among them, the parent string "coat" and child string "half coat", "cotton-padded coat", "cashmere coat", "wool coat" and "all kinds of coat" present to users in the form of recursive directory tree of retrieval words included retrieval string. As the parent-child relations of retrieval strings, users can see the parent string and its child strings of this retrieval string, as suggested in FIG. 3, the "wool coat" and "cotton-padded coat" that related to "coat".

The second part is to retrieve the described retrieval string in the system and to get the data related to the described retrieval string from data sheet of information indexes, namely, the summary content of information associated with the described retrieval. As shown in the right of FIG. 3, it is the relevant information in the data sheet of information indexes included retrieval string. For commodity information database, it usually contains the information such as name of the factory, brand, price, product name and so on. While for law information database, it usually contains various legal entities, legal liability category and so on. If it is about insurance, there may show various types of insurance.

By doing completely matching query on retrieval string in data sheet of information indexes to take the results of the query as well as the output of information data as the contents of the search returns. In this implementation, the following conjunctive query SQL sentence can be used to return the result "select * from xinxi, xinxiindex where xinxi.xinxiid=xinxiindex.xinxiid and xinxiindex.tmsp='keyword'". The search can be sorted according to the additional field in the data sheet of information indexes, such as time field or weight field and so on. Completely matching can get a more accurate search result, while the fuzzy matching can only get a wide result, they have their own functions, they can be chosen by function buttons.

Because the parent-child relationship between the parent and child string, users can list the relations of parent and child in the form of directory table of retrieval words. In terms of the result shown in FIG. 3, users not only get relevant results from the right content, but get the parent-child relation that contains retrieval strings from the left of FIG. 3, which also shows the logical relevance of these results.

In the existing technology, the relation among each retrieval result forms simply by click numbers of users. The search engines do not show out the parent and child relation of retrieval strings in the retrieval results. Arrangement relation of the retrieval results of existing technology relies on the numbers of users clicking or linking, neither the logic relation between retrieval strings, nor even the parent and child relation between strings that contains retrieval strings. So, there is an essential difference between them.

The searching process of directory table of retrieval words can be as follows: search whether there is a retrieval string in the directory table of retrieval words, if there is, use the retrieval string as tree root and search the child node of this retrieval string from the directory table of retrieval words, the query condition is the parent node number of the child node, namely, bplus equals to the number id of the current retrieval string. For instance, in the algorithm sample, the number of "coat" is 1, its child nodes are "cotton-padded coat", "cashmere coat" and "wool coat", their bplus value are 1. Correspondingly, there can use recursive method to return the child nodes of child nodes, and also can use Ajax technology to automatically generate child nodes of this node when clicks on this node. Child nodes under the same parent node can be sorted according to the character sequence of the nodes for easy to search and also can be sorted according to other sequences, it depends on users.

Structure of the directory list that contains the retrieval string generates through two kinds of relations: one is the left relation; the other is the right relation. The two relations can generate two directory tables of children retrieval words, and the two directory tables can formally merge into a directory table of retrieval words.

As a kind of optimization, considering that user's retrieval strings may have alias, so we can use the alias as retrieval string for the purpose of improving the accuracy and coverage of retrieval to search in the data table of information indexes and directory table of retrieval words, returning the corresponding result. In the implementation of this invention, first find out the alias corresponding to the current retrieval string through the alias data table, at the same time use the alias as retrieval string to search in the data sheet of information indexes and directory list of retrieval words, thus returning the corresponding result. For example, if the retrieval string of the current user is "potato", searches the alias data sheet and knows that there is a alias "murphy", then the system will use potato as a new retrieval string to retrieve, namely, after searching out the matching information from the data table of information indexes and directory list of retrieval words, returns to user. The data in the alias data table can be made by manual work.

Figures 4, 5:
As shown in FIG. 4, it is return data using the Google keyword tool.
As shown in FIG. 5, it is what Baidu returns instantly.

In order to show the difference between the retrieval effect of this invention and the existing technology in a more intuitive way, Figures will be used to comparatively illustrate in the following, FIGS. 4 and 5 provide two specific examples.

As shown in FIG. 4, it is the information returned by Google keyword tool. In this keyword tool, searching with "coat", it may return 150 pieces of information at most; the returned information includes "coat", "coat and scarf", "coat of men", "coat of women", "coat taobao", "VERO MODA coat", "JACK JONES coat", "fashionable coat", "coat", "popular coat", "men's coat", "women's coat", "prevalent coat", "coat wholesale" and so on, these information are separate without logical inclusion relationship, nor even has a directory list of retrieval words to show these logic inclusion relationship.

As shown in FIG. 5, it is the information returned from Baidu. When inputting "coat", the information returned are "wardrobe", "pictures of wardrobe", "inner structure pictures of wardrobe", "coat collocation", "styles of coat", "tying method of coat's bow" and "pictures of coat" and so on. Excepting contain the retrieval string "coat", these information do not show the logical inclusion among them, nor show the directory table of retrieval words that can reflect the logic connection among the information.

Synthesizing the differences among the FIG. 3, FIG. 4, and FIG. 5, we can know that no matter Baidu or Google, the retrieval prompt information is not comprehensive and there are no semantic features among the retrieval information. For example, from the point of semanteme, "men's coat" in FIG. 4 should be one kind of "Coat". "Wardrobe" in FIG. 5 is the broader concept of "pictures of wardrobe" and "inner structure pictures of wardrobe". However, these logic connections are not shown directly to us in the form of directory list of the retrieval words in FIG. 4 and FIG. 5.

The technical solution provided by the implementation of this invention not only can be applied to the generation of Search Tips but also can be applied to the automatic generation of the catalogues and the generation of Concept Tree in the professionally technical field.

Figure 6:
As shown in FIG. 6, the result is retrieved from the General Administration of Customs.

Application example No. 1: the Customs Code (HS Code) query of Customs Tariff. As shown in FIG. 6, the result is retrieved from the General Administration of Customs. When querying by using the retrieval string "coat" in the official website of the General Administration of Customs "Home>Home>Product query", the website's fuzzy query engine will return 8 pages, a total of 158 records. These records present to the searchers by the form of a list which includes commodity coding and trade names. But it does not show the internal logical link between these trade names, for example, "coat" is the superordinate concept of "man's coat", "wool-woven men's coat", "cotton-woven woman's coat" etc. If the method—regarding the trade name as the parent string or substring in the directory table of the retrieval words, which is provided by the implementation of this invention, is applied, it will greatly enhance the user experience and narrow down the user's query. Its display to the retrieval after the generation of directory list of retrieval words is just as shown in FIG. 3 of this invention.

Application example No. 2: the trademark registration uses the classification table of products and services. When registering trademarks, you need to inquire about the similar trademarks of the same industry's products. By using the methods provided by the implementation of this invention, it is more convenient to look up the product category of the registered trademarks, and provide a reference for the user's choices. What is shown in FIG. 7 is the example of using the directory table of retrieval words constructed by the implementation of this invention, and keywords are "cord fabric" and "fabric". The figure has two parts; part of the screenshot of "cord fabric" directory tree is on the left, and part of the screenshot of fabric's directory tree is on the right. The species or services related to cord fabric can be seen on the left side, and species include the expanded cord fabric, polyester tire cord fabric, nylon tire cord fabric, dipped tire cord fabric and other species, and services include processing cord fabric and so on. On the right is the goods related to the retrieval string "fabric", such as "lining", "cloth". Meanwhile, you can find several different but synonymous descriptions which are related to "cloth": lining and lining fabric, etc. If adopting the alias data table, it will further help the user to find the target information precisely.

Figure 8:
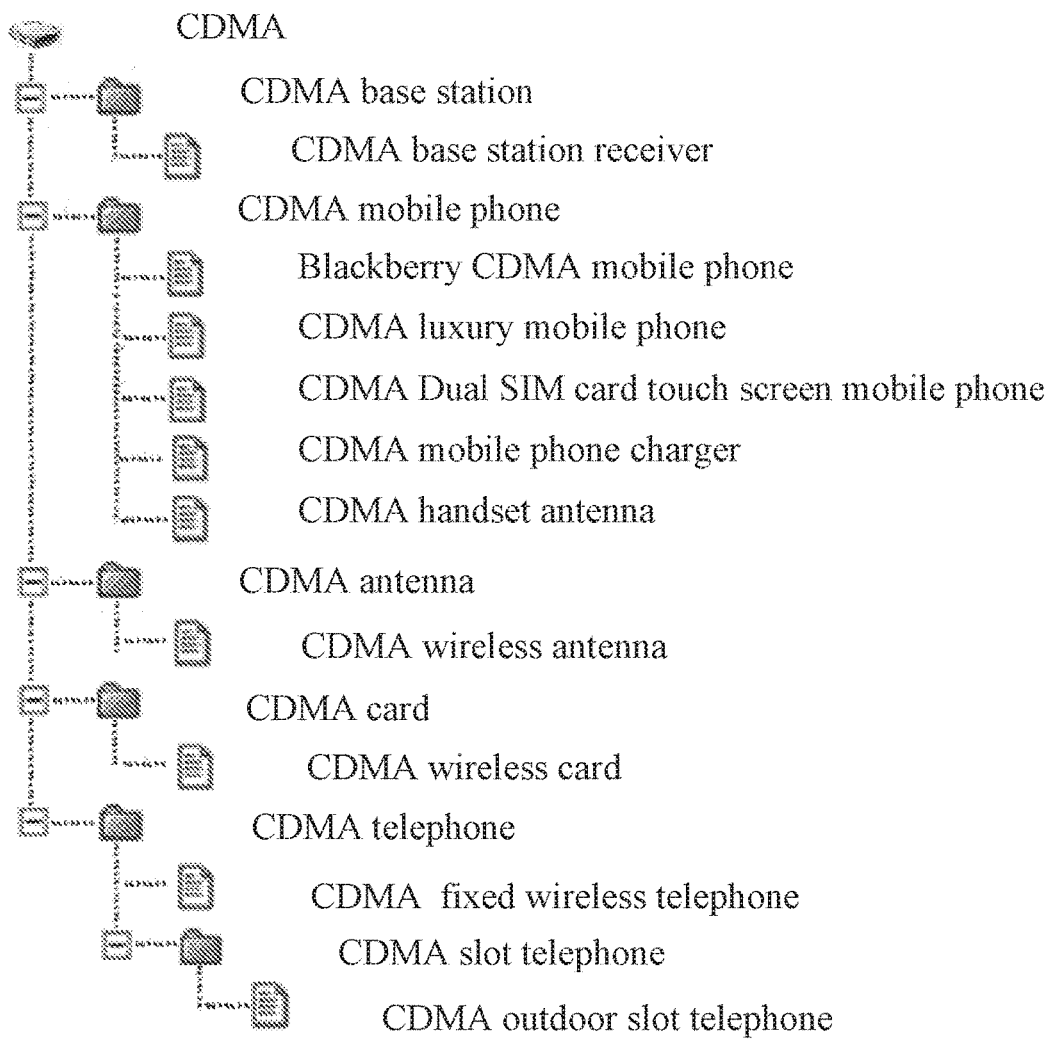
As shown in FIG. 8, it is the display of directory table of retrieval words after the CDMA processing.

Application example No. 3: automatic classification of industry-specific products in National Economical Industry Classification. Some industries such as Textiles, Fashion industry, Leather industry, Electronics industry and other industries are only simple industry descriptions in National Economical Industry Classification. However, the products of these industries generally don't have more specific and detailed classification and the product type update is generally faster. It can make the classification automation by using the way provided by the implementation of this invention. Whenever adding a new product type, the new products can be accepted by existing directory table of retrieval words and information index data table only by using the technical solution provided by the implementation of this invention to automatically index or segment related products' information and extract the retrieval string to generate the directory table of retrieval words and information index data table, which makes the implementation of this invention's ability of widely accepting new product types strong. Taking CDMA products for example, the known types include: CDMA mobile phone, Blackberry CDMA mobile phones, Luxury CDMA mobile phone, Dual SIM CDMA mobile phone, CDMA mobile phone charger, CDMA antenna, CDMA wireless antenna, CDMA card, CDMA wireless Internet access card, CDMA phone, CDMA fixed wireless telephone, CDMA payphone, Outdoor CDMA payphone. As shown in FIG. 8, it is the directory list of retrieval words that is displayed after the CDMA products were processed by the implementation of this invention. The implementation of this invention indexes, segments CDMA products automatically and then generates the directory list of retrieval words. All the CDMA products can find a suitable location in the displayed directory list of retrieval words which is shown in the figure, and the directory list of retrieval words suits for the increase of new products.

Figure 9:
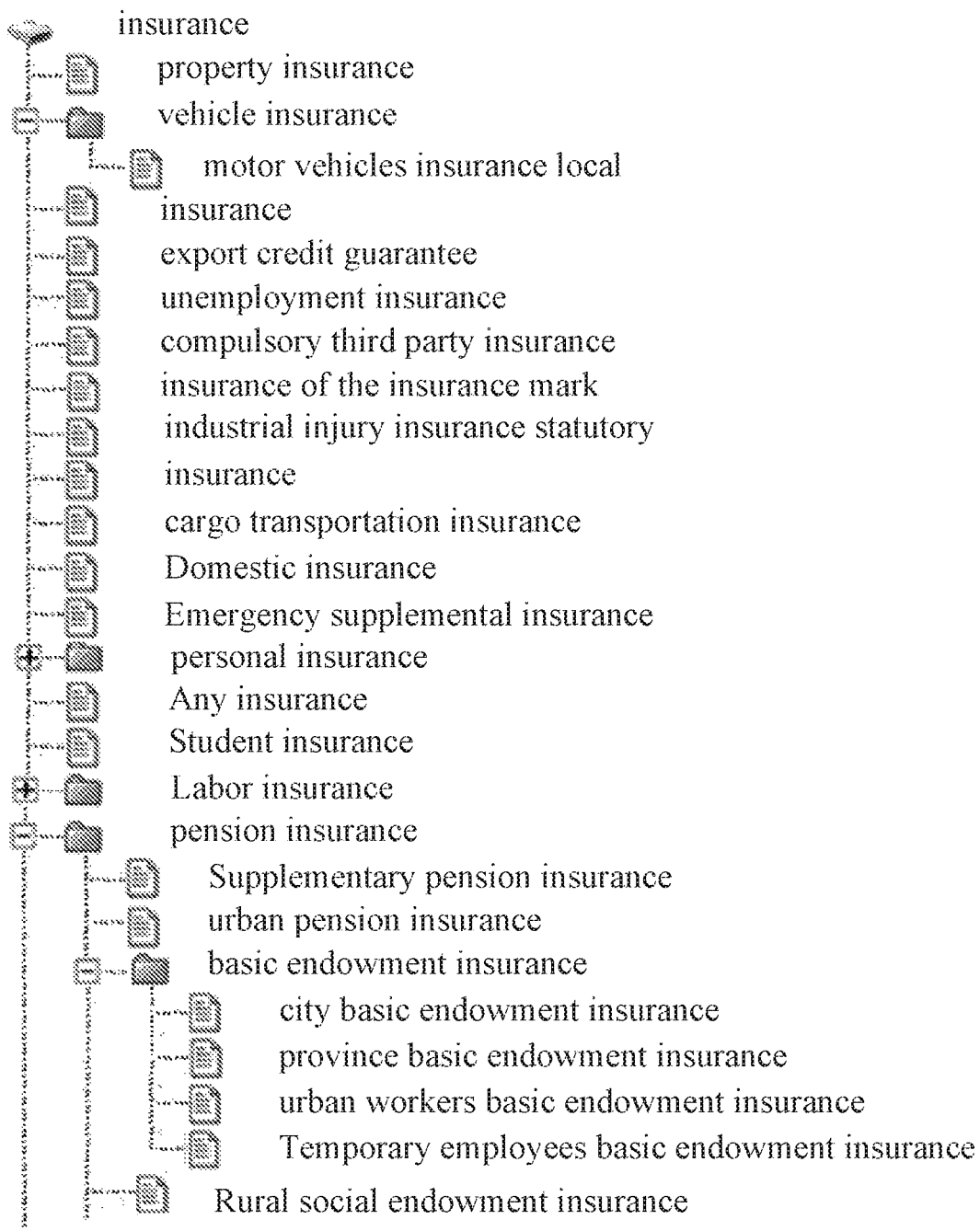
As shown in FIG. 9, it is the embodiment the insurance construct concept tree diagram illustrating an example embodiment of the present invention.

Application example No. 4: the concept tree constructed in the field of legal profession. As shown in FIG. 9, it is the sample graph of the concept tree of "insurance" constructed by the implementation of this invention. We use the directory table of retrieval words constructed by the implementation of this invention to constitute an arborescence network semanteme whose root node is superordinate concept of the concept set in the specific field, and whose child node is the subordinate concept. The superordinate concept is a summary of all of its subordinate concepts' attributes, and the subordinate concept is the refinement of the superordinate concept from different perspectives. The implementation ways of this invention are as follows:

1. After automatically indexing or segmenting the legal provisions, take the concept phrase to establish inverted index, and establish inverted index for insurance, property insurance, vehicle insurance, local insurance, export information insurance, industry insurance, third party liability compulsory insurance, insurance of the subject matter of preceding paragraph, industrial injury insurance, the state statutory insurance, cargo insurance, life insurance, labor insurance, pension insurance, travel accident insurance and so on. The inverted index can be established in a variety of ways;

2. And then use these concept phrases as the retrieval string to generate the original retrieval word data table. After exclusively choosing insurance, property insurance, vehicle insurance, local insurance, export information insurance, industry insurance, third party liability statutory insurance, insurance of the subject matter of preceding paragraph, industrial injury insurance, the state statutory insurance, cargo insurance, life insurance, labor insurance, pension insurance, travel accident insurance in the inverted index table, establish the original directory table of retrieval words by taking these words as the retrieval string;

3. Generate a directory table of retrieval words according to the original retrieval word data table. As shown in FIG. 9, after generating a directory table of retrieval words for insurance, property insurance, vehicle insurance, local insurance, export information insurance, industry insurance, third party liability compulsory insurance, insurance of the subject matter of preceding paragraph, industrial injury insurance, the state statutory insurance, cargo insurance, life insurance, labor insurance, pension insurance, travel accident insurance and other insurances, the directory table of retrieval words presents in the form of a recursive directory tree and this directory table of retrieval words takes legal concept as node.

4. When receiving the user's retrieval request, it will return the concept tree structure that contains the retrieval string. What is returned to the user in this example is the concept tree structure related to insurance, as shown in FIG. 9.

You can classify the related legal entry by using the directory table of retrieval words. On this basis, you can clearly see the related retrieval strings and the logical links between them which makes a higher precision when retrieving.

In the application example which is shown in FIG. 9, the manifestation of the concept tree is the same as the recursive directory tree. In fact, in various implementation of this invention, the recursive directory tree's manifestations are diverse, and are not limited to the figures' various ways. Its core lies in the kinship existing in each retrieval string.

Figures 1, 10:
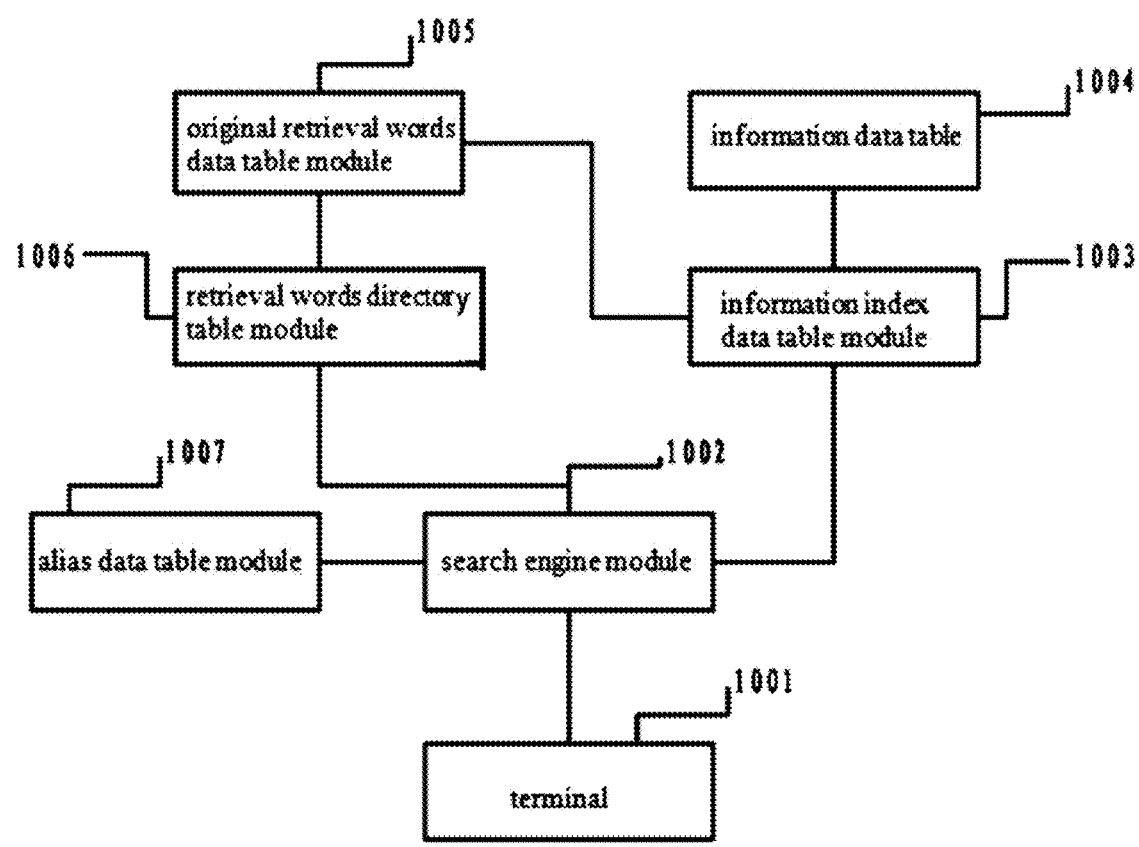
As shown in FIG. 10, it is a system diagram of the present invention.
Figures 2, 10:
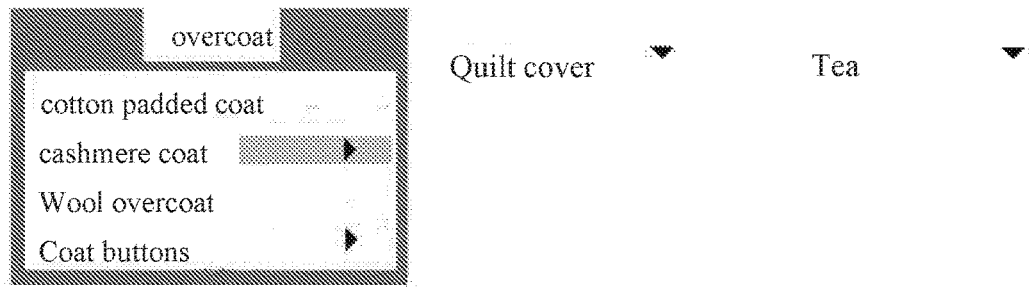

As shown in FIG. 10, it is a schematic view of data flow of the structure of the implementation of this invention.

When the search engine receives the retrieval string the user inputs, it will query in the retrieval string of the directory table of retrieval words and information index data table. The information data table generates the information index data table which generates the original retrieval words table, and the original retrieval word data table generates the directory table of retrieval words. The search engine will retrieve the alias data tables to query the alias that the retrieval string corresponds to.

In the implementation of this invention, you can construct a directory tree according to the parent-child relationships between data items and data items in the set of data items within the same directory tree in the directory table of retrieval words (use bplus field or other ways to determine). The display of directory tree can be realized by selecting the appropriate technology including stand-alone software, client-server mode and the browser server mode depending according to the specific circumstances. Such as: using customized client to realize the tree structure by programming; the html language package is displayed as a tree structure in the browser; the wml language package is displayed as a tree structure in the mobile browser. The specific display mode does not exceed the protection scope of the implementation of this invention.

Recursive directory tree helps to show the hierarchy between the various retrieval strings. Directory tree is the most common and the most intuitive way, but the specific display may vary, and there are many variant display ways. For example, the multi-level menu that is directory-enabled is a deformation of the directory tree, and the lower menu is subitem of the previous menu. Although it has many forms, but the parent-child relationship of superior and lower level and the hierarchy it showed are constant.

As shown in FIG. 10-1, it is the graphical example of directory-enabled multi-level menu provided by the implementation of this invention. Child node under the same node in the directory tree structure is deformed into the lower menu. The lower menu will have dynamic display when the cursor moves. For example, when the user pays attention to wool coat and move the cursor on it, it will show its lower nodes men's wool coat and women's wool coat. In this case, the nature of the recursive directory tree's structure is not changed, and all the child nodes have a common parent node "coat". What is changed is only its display way. It provides users with another display way of the directory tree structure.

As shown in FIG. 10-2, it is the graphical example of directory-enabled multi-level menu and example of product information result provided by the implementation of this invention. In the implementation of this invention, when the cursor selects cashmere coat, it will query in the retrieval strings of the directory table and information index data table correspondingly. The directory table of the retrieval words will return the related retrieval strings, such as cotton coat, cashmere coat, wool coat and coat buttons. Information index data table returns the commodity information related to the currently selected retrieval string, such as cashmere coats of various brands.

In various implementation of this invention, the second set of data items which can be sent to the user includes the following steps:

1 The second set of data items which is obtained through the information index data table and the retrieval string's simple match with the first set of data items, including the following two ways:

1.1 When the input retrieval string is a node of the first set of data items, it will directly display the information of the retrieval string's exact match. As shown in FIG. 3, it displays the product information corresponding to the retrieval string "coat" directly;

1.2 When the input retrieval string is a node of the first set of data items, it will indirectly display the information which matches with the retrieval string exactly through the first set of data items' tips, guide and links. As shown in FIG. 10-2, it displays the product information of cashmere coat that matches with the retrieval string "coat" and indirectly related to the retrieval string "coat".

2 The second set of data items obtained through the recursive composition of the first set of data items' match with the retrieval strings, including:

2.1 If the user's retrieval string has no retrieval results in the information index data table, it will return the recursive matching results; If the retrieval string "rabbit fur coat" the user inputs has no retrieval results in the information index data table, it can return the parent node of the retrieval string. The parent node is the related retrieval result that has inclusion relationship such as "coat";

2.2 No matter the retrieval string the user inputs hits any node of the first set of data items, the whole or part of the information corresponding to each node in the first data items is shown. In FIG. 12, no matter which node in insurance is input, such as industrial injury insurance, it can display the corresponding information in the information index data table. The information is corresponding to the nodes which are matched with the recursions of "insurance", "social insurance", "industrial injury insurance". It can also display the information corresponding to the relative combinations "urban social insurance", "local social insurance" and other relative combinations in the information index data table.

For the 2.1 further, when returning the information about the retrieval string's superordinate concept, if the user clicks on a specific subordinate concept, it will display the information of the subordinate concept. For example, no matter the word you input is "coat" or "cashmere coat", it will return the product information related to "coat" directly. When the user further selects "cashmere coat" or other subordinate concepts, it will return the information corresponding to "cashmere coat" or other subordinate concepts again. Or for the 2.2 further, the information of recursive matching combinations can have many arrangement nodes of display. Changes in the ways of these displays do not exceed the protection scope of this invention.

This invention generates a directory table of retrieval words and returns the directory table of retrieval words to the user by automatically indexing or segmenting the original data information to obtain a retrieval string, which makes the user have good retrieval experience. The implementation of this invention solves the technical problems of many aspects such as the data sources, structures and display ways of directory table of retrieval words. What's more, it has a good market prospect.

The implementation modes of this invention which are described above do not constitute a limitation to the protection scope of this invention. Any modification, equivalent replacement or improvement, etc. made within the spirit and principles of this invention, should be included in the protection scope of this invention.

The invention claimed is:

1. A retrieval method wherein the method comprises the following steps:
  A. searching a directory table of retrieval keywords based on retrieval words inputted by a user at a terminal, and acquiring a first data items set comprising a plurality of individual data items each related to the retrieval words, wherein there exists kinship between any two individual data items in the first data items set, and wherein the directory table is stack-based;
  B. searching an information index data table based on each individual data item of the first data items set, each individual data item being related to the retrieval words, and, as a result, acquiring a second data items set, wherein the information index table is an inverted index; and
  C. combining the first data items set and the second data items set, and sending a resulting combined data set to the terminal, wherein the first data items set is combined in a recursive way, wherein the said step A further comprises the step of:
  A1. generating the directory table of the retrieval words, wherein in the said step A1, generating the directory table of the retrieval words further comprises the steps of:
  A11, extracting a plurality of original strings from data items to generate the information index data table, matching any two related strings of the plurality of original strings with each other, and determining a containment relationship between the two related strings, wherein the data items are full text pages;
  A12. Determining a parent-child relationship between the two related strings based on the containment relationship;
  A13. generating data items sets D1, D2, . . . Dn based on the parent-child relationship by dividing the plurality of original strings into the data item sets D1, D2 . . . Dn, wherein, n is greater than or equal to 1; and constituting a directory table of retrieval words of the data items sets (D1, D2 . . . Dn), wherein there is kinship between the original strings of each data item in each data items set Dn.

2. The retrieval method according to claim 1, wherein in the said step B, the acquiring of the second data items set comprises the steps of:
searching the information index data table based on each data item of the first data items set, and acquiring the second data items set by matching each data item of the first data item set; or
searching the information index data table based on each data item of the first data items set, and acquiring the second data items set by recursively matching each data item of the first data item set.

3. The retrieval method according to claim 1, wherein the containment relationship comprises: left-contain, right-contain, center-contain and no-contain.

4. The method according to claim 3, wherein the step A12 further comprises the steps of:
setting the two related strings to parent-child relationship if the two related strings constitute the left or right containment relationship;
setting the original two strings sets to parent-child relationship if the two related strings constitute an inclusion relationship.

5. The retrieval method according to claim 4, wherein in step A13, if the relationship is right containment, the data items set constitutes the directory table of retrieval words and further includes constituting the directory table of retrieval words on the basis of a backward sequencing of the data items set, the backward sequencing of strings includes the following steps:
A131. generating a reversed retrieval words field by reversing a retrieval words field;
A132. initializing an inherited rectilinear tree stack to empty;
A133. creating a sql cursor and obtaining all data sorted by the reversed retrieval words fields;
A134. reading current data from the cursor to the inherited rectilinear tree stack; and if there is no data, the current data is empty, then skip to step A1310; otherwise, enter into step A135;
A135. initializing the temporary rectilinear tree stack to empty;
A136. skipping to step A138 if the inherited linear tree stack is empty;
A137. searching elder nodes of the current data from the inherited linear tree stack if the inherited linear tree stack is not empty;
if there are elder nodes, pushing the elder nodes on the temporary linear tree stack and the last one of the elder nodes is a parent node, and then modifying parent serial number value of the current cursor to the parent node number;
if no elder nodes are in the temporary rectilinear tree stack, setting the parent serial number value of the current cursor to 0; and assigning the value of the temporary rectilinear tree stack to the inherited one; and pushing the current data on the inherited linear tree stack, then skipping to step A139;
A138. pushing the current data on the inherited rectilinear tree stack and the parent serial number value of the current cursor is updated to 0;
A139. moving the cursor to next, and skipping to step A134, reading the next data, then executing cycle; and
A1310. ending the sequencing.

6. The retrieval method according to claim 1, wherein step A11 further includes the step of generating an original retrieval words data table which includes the following steps:
obtaining the original retrieval keywords data table by removing repetitive original strings based on information index data of the information index data table.

7. The retrieval method according to claim 6, further comprising the step of generating the information index data table which includes the following steps:
extracting a plurality of original strings from data items as index keywords;
establishing an inverted data table by using the index keywords and data items, and then, generating the information index data table based on the inverted data table.

8. The retrieval method according to claim 1, further comprising the following steps:
searching an alias data table based on the input retrieval keywords, and acquiring alias retrieval keywords corresponding to the input retrieval keywords;
executing steps A-C again based on the alias retrieval keywords as new keywords.

* * * * *